(12) United States Patent
Riddering

(10) Patent No.: US 9,875,764 B1
(45) Date of Patent: Jan. 23, 2018

(54) HEAD-MEDIUM CONTACT SENSOR CLEANING FOR HEAT-ASSISTED MAGNETIC RECORDING DEVICE

(71) Applicant: Seagate Technology LLC, Cupertino, CA (US)

(72) Inventor: Jason W. Riddering, Prior Lake, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/432,360

(22) Filed: Feb. 14, 2017

Related U.S. Application Data

(60) Provisional application No. 62/303,663, filed on Mar. 4, 2016.

(51) Int. Cl.
| | |
|---|---|
| G11B 21/02 | (2006.01) |
| G11B 5/60 | (2006.01) |
| G11B 5/41 | (2006.01) |
| G11B 5/455 | (2006.01) |
| G11B 5/00 | (2006.01) |

(52) U.S. Cl.
CPC ............ G11B 5/6076 (2013.01); G11B 5/41 (2013.01); G11B 5/455 (2013.01); G11B 2005/0021 (2013.01)

(58) Field of Classification Search
None
See application file for complete search history.

(56) References Cited

U.S. PATENT DOCUMENTS

| | | | |
|---|---|---|---|
| 6,690,535 B2 | 2/2004 | Wang | |
| 6,853,508 B2* | 2/2005 | Smith | G11B 5/41 324/210 |
| 8,665,546 B1 | 3/2014 | Zhao et al. | |
| 8,995,076 B1 | 3/2015 | Olson et al. | |
| 8,995,080 B1 | 3/2015 | Mou et al. | |
| 9,042,047 B1* | 5/2015 | Dube | G11B 5/012 360/55 |
| 9,437,234 B1 | 9/2016 | Kim et al. | |
| 2002/0085304 A1 | 7/2002 | Wang | |

* cited by examiner

*Primary Examiner* — K. Wong
(74) *Attorney, Agent, or Firm* — Hollingsworth Davis, LLC

(57) ABSTRACT

A slider is configured for heat-assisted magnetic recording to a magnetic recording medium. A low- or non-modulation interface is defined between the slider and the medium. A contaminant is present on the slider and between the slider and the medium. A controller is configured to control the slider to dislodge the contaminant from the slider by performing modulation-based contact detection at a location of the medium where modulation-based contact detection can accurately detect head-medium contact. The controller is also configured to perform friction-based contact detection using the slider devoid of the contaminant.

20 Claims, 11 Drawing Sheets

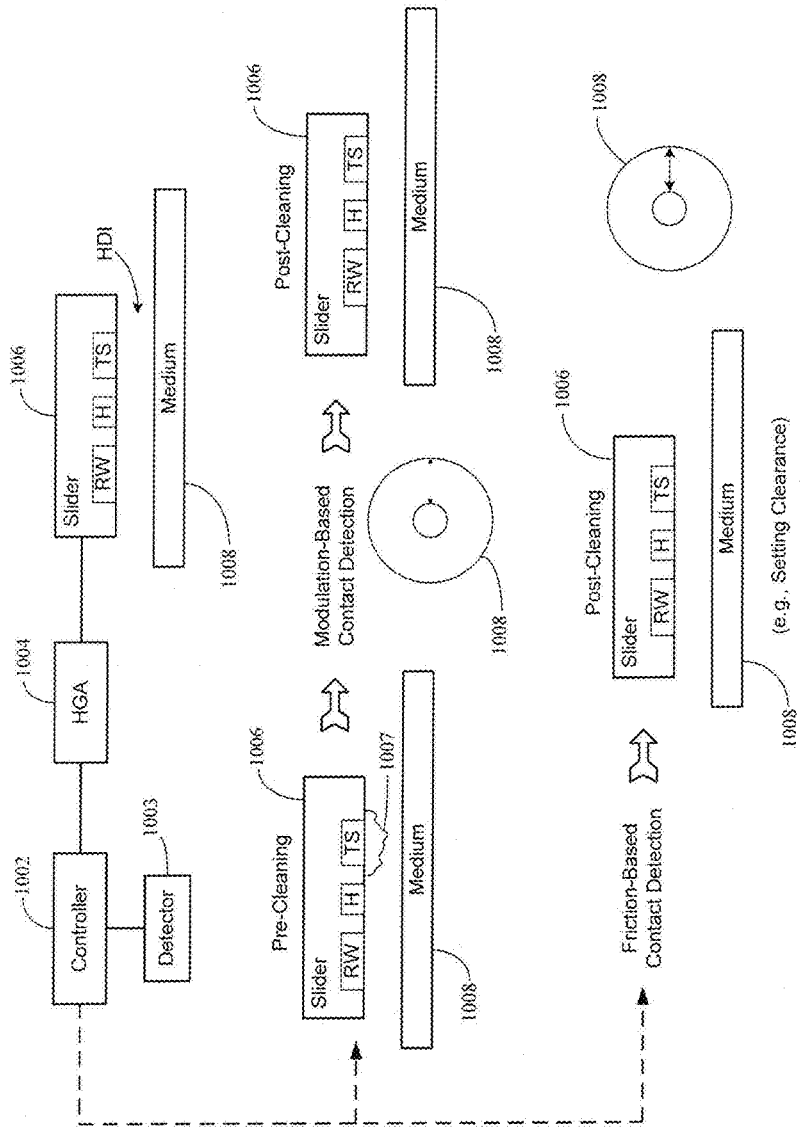

HEAD-MEDIUM CONTACT SENSOR CLEANING FOR HEAT-ASSISTED MAGNETIC RECORDING DEVICE

RELATED PATENT DOCUMENTS

This application claims the benefit of Provisional Patent Application Ser. No. 62/303,663 filed on Mar. 4, 2016, to which priority is claimed pursuant to 35 U.S.C. §119(e), and which is incorporated herein by reference in its entirety.

SUMMARY

Embodiments are directed to a method comprising providing relative movement between a heat-assisted magnetic recording slider and a magnetic recording medium. A low- or non-modulation interface is defined between the slider and the medium. A contaminant is present on the slider and between the slider and the medium. The method also comprises dislodging the contaminant from the slider by performing modulation-based contact detection at a location of the medium where modulation-based contact detection can accurately detect head-medium contact. The method further comprises performing friction-based contact detection using the slider devoid of the contaminant.

Various embodiments are directed to an apparatus comprising a slider configured for heat-assisted magnetic recording to a magnetic recording medium. A low- or non-modulation interface is defined between the slider and the medium. A contaminant is present on the slider and between the slider and the medium. A controller is configured to control the slider to dislodge the contaminant from the slider by performing modulation-based contact detection at a location of the medium where modulation-based contact detection can accurately detect head-medium contact. The controller is also configured to perform friction-based contact detection using the slider devoid of the contaminant.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 10 is a block diagram of a contact detection apparatus configured to implement pre-cleaning of a HAMR slider in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Embodiments of the disclosure are directed to detecting contact between a HAMR slider and a magnetic recording medium for a low- or non-modulation head-disk-interface defined between the slider and the medium. Embodiments are directed to cleaning a friction-based contact sensor of a HAMR slider prior to performing contact detection between the slider and a magnetic recording medium. More particularly, embodiments are directed to cleaning a friction-based contact sensor of a HAMR slider using a modulation-based contact detection technique prior to performing friction-based contact detection between the slider and a magnetic recording medium.

In a low- or non-modulation HDI, the air bearing is relatively stiff. The relatively stiff air bearing makes it challenging to detect head-medium contact events using techniques that rely on modulation of the air bearing or a sensor/component of a HAMR slider. Modulation-based contact detection techniques are known to be unreliable at certain regions (e.g., middle-diameter locations) of a magnetic recording medium supporting a stiff air bearing. As such, modulation-based contact detection cannot be used to provide reliable contact detection across all locations of a recording medium having a low- or non-modulation HDI.

However, there are certain locations of the medium where modulation-based contact detection can be used to provide reliable contact detection for arrangements having a low- or non-modulation HDI. Such locations include locations at or near the inner diameter (ID) and at or near the outer diameter (OD) of the medium. A slider cleaning methodology of the present disclosure exploits the limited-reliability of modulation-based contact detection for cleaning a slider, while exploiting the high reliability of friction-based contact detection following the cleaning procedure for HAMR (or non-HAMR) devices having a low- or non-modulation HDI. As such, embodiments of the disclosure are directed to apparatuses and methods that provide for reliable detection of head-medium contact events for low- or non-modulation HDIs, such as for setting clearance of the slider.

Figure 1:
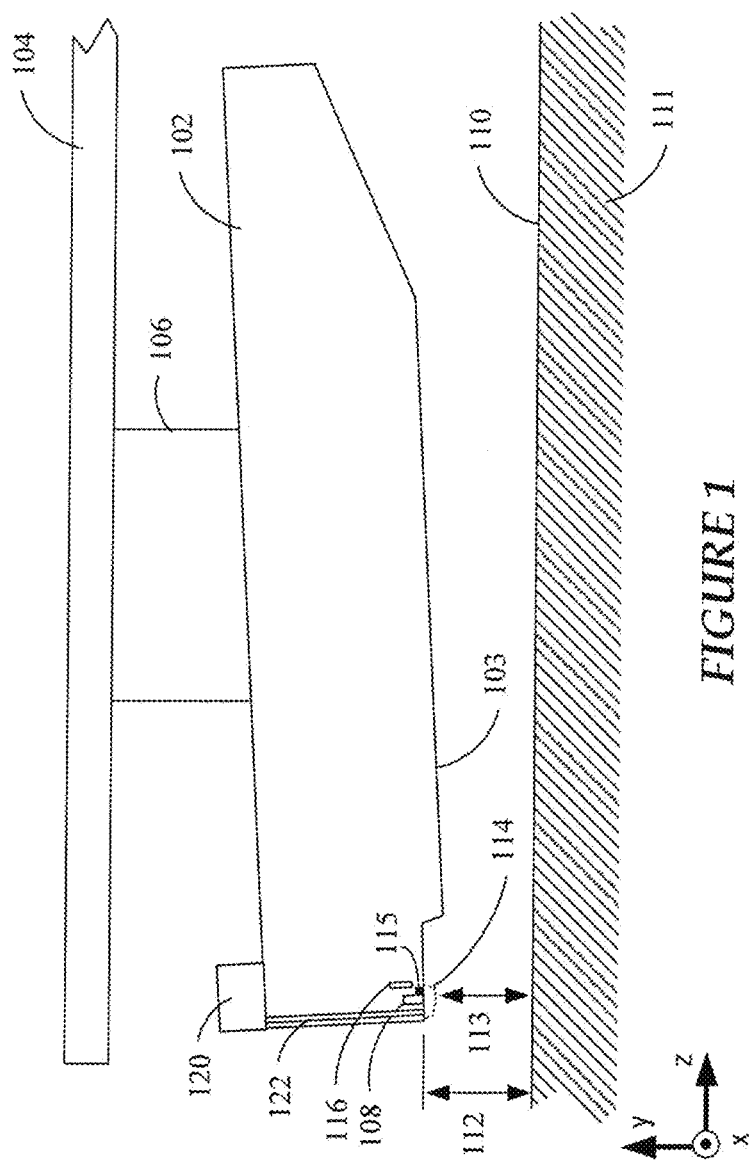
FIG. 1 shows a view of a slider configured for heat-assisted magnetic recording (HAMR) with which embodiments of the present disclosure can be implemented.

FIG. 1 shows a side view of a slider (e.g., read/write head) 102 configured for magnetic recording according to a representative embodiment. The slider 102 may be used in a magnetic data storage device, e.g., a hard disk drive. The slider 102 is coupled to an arm 104 of a head gimbal assembly (HGA) by way of a suspension 106 that allows some relative motion between the slider 102 and arm 104. The slider 102 includes read/write heads 108 at a trailing edge that are held proximate to a surface 110 of a magnetic recording medium 111, e.g., magnetic disk. The slider 102 further includes a laser 120 and an optical waveguide 122. The waveguide 122 delivers light from the laser 120 to components (e.g., a near-field transducer) near the write head 108 of the slider 102.

When the slider 102 is located over surface 110 of recording medium 111, a flying height 112 is maintained between the slider 102 and the surface 110 by a downward force of arm 104. This downward force is counterbalanced by an air cushion (air bearing) that exists between the surface 110 of the recording medium 111 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write heads 108 and the magnetic recording medium 111, and generally defines the head-to-medium spacing 113. The slider 102 can have several close points, such as a writer close point and a reader close point, which are developed during write and read operations respectively.

To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. Often, a writer heater is situated on the slider 102 to thermally actuate the writer during write operations, thereby making the writer the close point. A reader heater is often situated on the slider 102 to thermally actuate the reader during read operations, thereby making the reader the close point. A thermal sensor 115 is shown situated at or near the close point 114 (e.g., adjacent the read/write heads 108, such as near the near-field transducer) or can be positioned at another location of an air bearing surface (ABS) 103 of the slider 102. More than one thermal sensor 115 can be incorporated, such as one near the writer/NFT and another near the reader.

Figure 2:
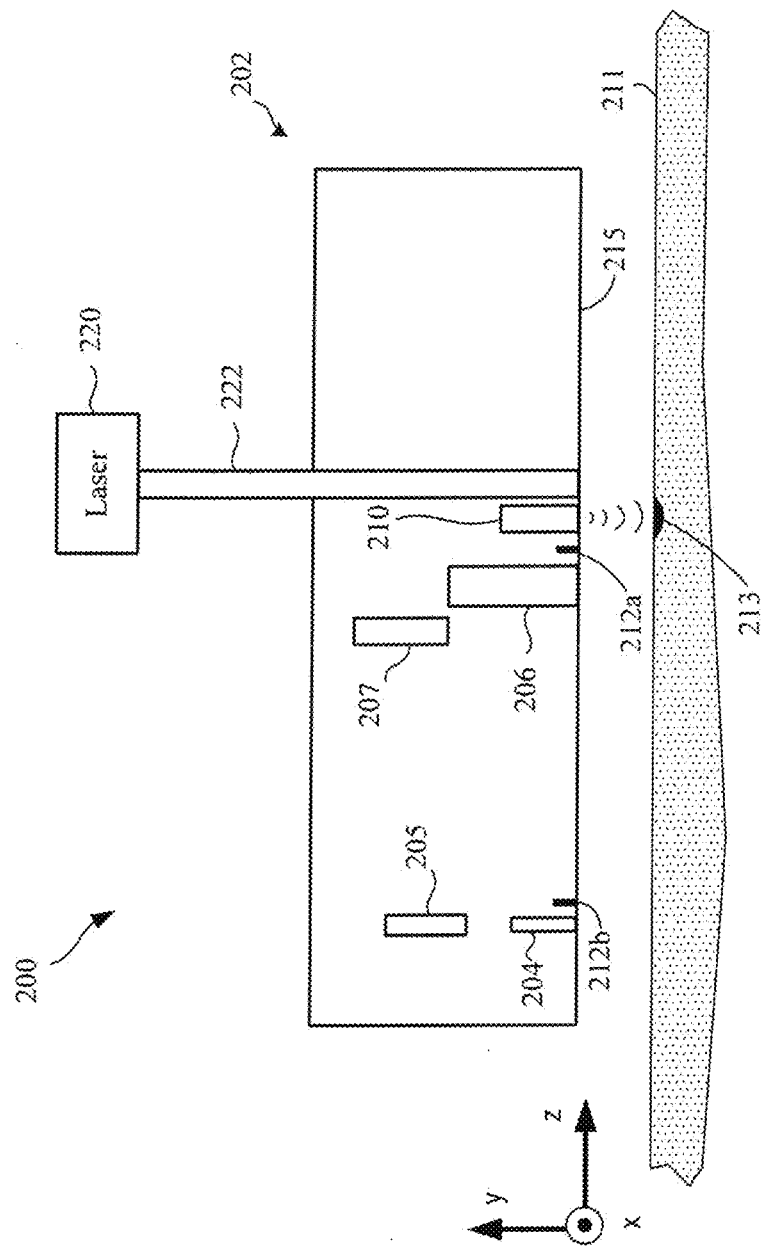
FIG. 2 shows a view of a slider configured for HAMR with which embodiments of the present disclosure can be implemented.

FIG. 2 shows a slider arrangement 200 in accordance with various embodiments. The slider arrangement 200 includes a slider 202 positioned proximate a rotating magnetic medium 211. The slider 202 includes a reader 204 and a writer 206 proximate an air bearing surface (ABS) 215 of the slider 202 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212a, 212b can be situated at various locations on the slider 202 at or near the ABS 215 for purposes of monitoring temperature, head-medium spacing changes, and head-medium contact, and for setting slider clearance.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider 202.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot 213 on the medium 211.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 gets absorbed by the magnetic medium 211, thereby raising the temperature (e.g., above the Curie temperature) of the spot 213 on the medium 211 as data is being recorded.

For an accurate write and read operations to occur, it is desirable to have a relatively small distance or spacing between a slider and its associated magnetic recording medium. This distance or spacing is known as "fly-height" or "head-medium spacing." By reducing the fly height, a slider is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems. Higher contact detection repeatability enables lower active clearance, and thus higher recording density. Higher contact detection sensitivity reduces wear and improves reliability.

Figure 3A:
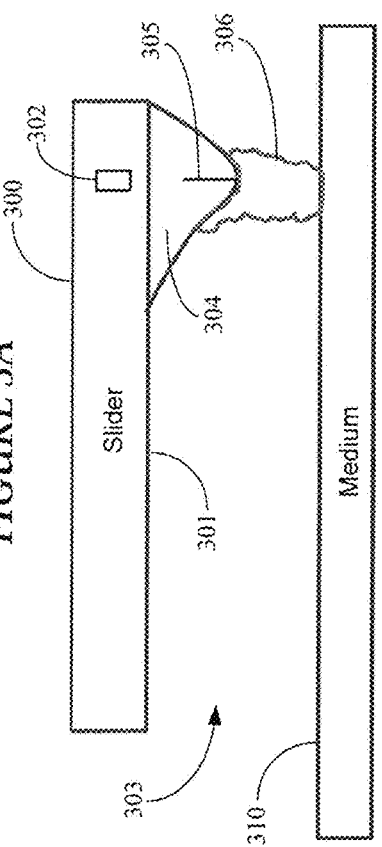
FIG. 3A shows a HAMR slider with a contaminant covering some or all of a friction-based contact sensor of the slider.

FIG. 3A shows a HAMR slider 300 in proximity to a magnetic recording medium 310. A low- or non-modulation HDI 303 is defined between the slider 300 and the medium 310. The slider 300 includes a friction-based sensor 305, such as a thermal sensor, configured to detect contact between the slider 300 and the medium 310. The thermal sensor 305 may be a resistive sensor with a high temperature coefficient of resistance (TCR), such as a dual-ended TCR (DETCR) sensor. The thermal sensor 305 may also comprise a thermocouple or a thermistor, for example. The thermal sensor 305 is considered a friction-based contact sensor, which produces a readily detectable signal when physically contacting the surface of the medium 310 during contact. The thermal sensor 305 is shown positioned at a protruded portion of the ABS 301 of the slider 300. The protrusion 304 is developed by heat generated by a heater 302 of the slider 300. The protrusion 304 can define a close point of the slider 300, and can represent a close point of the writer, the reader, or other component/location of the slider 300.

FIG. 3A shows a contaminant 306 disposed between the thermal sensor 305 and the medium 310. The contaminant 306 can accumulate on or near the thermal sensor 305, on the surface of the medium 310, or on both the thermal sensor 305 and the medium 310. For example, a lubricant is typically applied to the surface of the medium 310 as a molecularly thin film (e.g., a thickness from 10 to 50 Angstroms), and serves to reduce wear of the medium surface due to contact with the slider 300. Perfluoropolyethers (PFPEs) are often used as an effective lubricant for thin-film recording media. As the slider 300 flies over the surface of the medium 310, the slider 300 interacts with the lubricant and hydrocarbon contaminants 306 on the medium 310. Over time, the lubricant and/or other contaminants 306 can transfer to the slider 300 and accumulate on the ABS 301 at or near the thermal sensor 305. For example, the contaminant 306 can smear across the thermal sensor 305, which adversely impacts the accuracy of contact detection using a response of the contaminated thermal sensor 305.

Figure 3B:
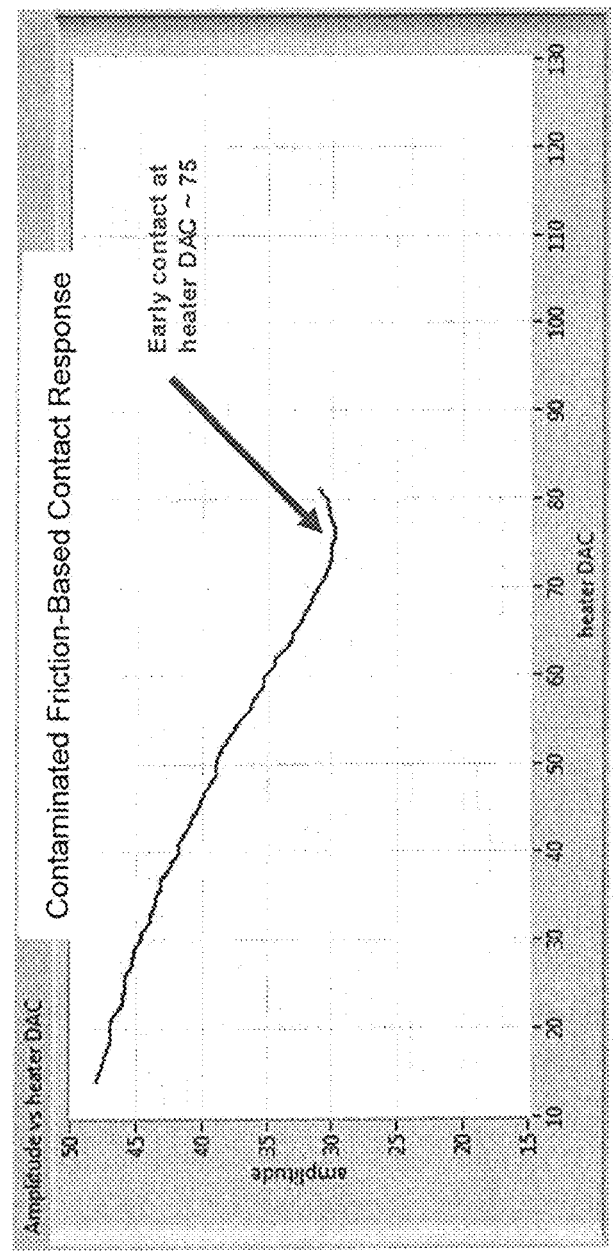
FIG. 3B is a graph showing early head-medium contact indicated by a friction-based contact sensor due to the presence of a contaminant between the contact sensor and a magnetic recording medium.

FIG. 3B is a graph showing premature head-medium contact indicated by a friction-based contact sensor (e.g., thermal sensor 305) due to the presence of a contaminant 306 between the contact sensor 305 and the recording medium 310. FIG. 3B shows the amplitude of the thermal sensor response at different heater DAC (digital-to-analog converter) values. Each heater DAC value corresponds to a fixed amount of power supplied to the heater 302. As the heater DAC values increase, the extent of the slider protrusion 304 increases, causing the thermal sensor 305 to move closer to the surface of the medium 310. As is shown in FIG. 3B, a response of the contaminated thermal sensor 305 indicates premature head-medium contact at a heater DAC value of about 75. The thermal sensor 305 incorrectly detects head-medium contact at the heater DAC value of about 75 due to the presence of the contaminant 306. It can be appreciated that setting slider clearance based on the inaccurate DAC value of about 75 in this illustrative example would result in a sub-optimal clearance setting.

Figure 4A:
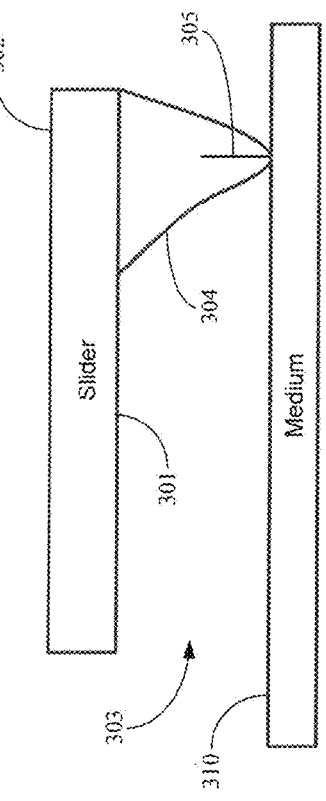
FIG. 4A shows the HAMR slider of FIG. 3A after completion of a modulation-based cleaning procedure according to various embodiments, wherein the contaminant is dislodged from the slider.
Figure 4B:
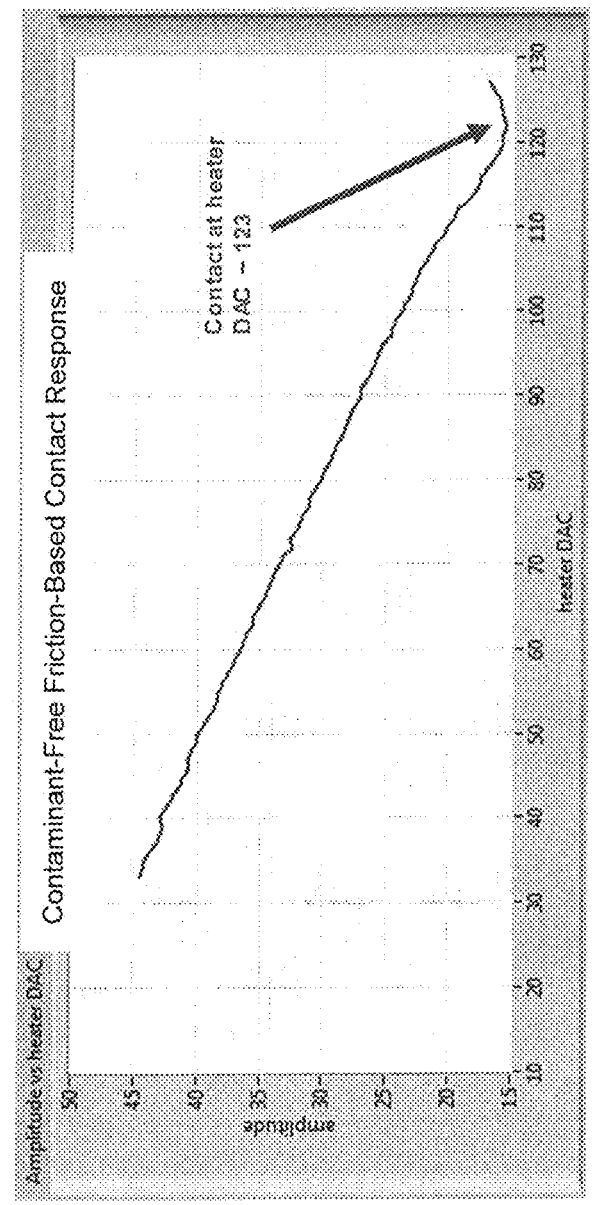
FIG. 4B is a graph showing actual (accurate) head-medium contact indicated by a friction-based contact sensor after completion of a modulation-based cleaning procedure according to various embodiments.

FIG. 4A shows the slider and medium arrangement of FIG. 3A after the contaminant 306 has been dislodged by implementation of a modulation-based cleaning procedure in accordance with various embodiments. Because the thermal sensor 305 shown in FIG. 4A is devoid of the contaminant 306, the thermal sensor 305 can correctly indicate head-medium contact between the slider 305 and the medium 310. FIG. 4B is a graph showing actual head-medium contact indicated by the thermal sensor 305, which occurs at a heater DAC value of about 123. It can be appreciated that setting slider clearance based on the accurate DAC value of about 123 in this illustrative example would result in an optimal clearance setting.

According to various embodiments, friction-based contact detection is used in a HAMR device for detecting head-medium contact after cleaning the contact sensor using modulation-based contact detection. It is been found that friction-based contact detection is reliable for low- and non-modulation HDIs, but is sensitive to the presence of contaminants at or near the fiction-based contact sensor (e.g., a DETCR). It has also been found that modulation-based contact detection is less sensitive than friction-based contact detection to the presence of contaminants. Various modulation-based contact detection techniques disclosed herein utilize a signal acquired by the reader of the slider. Various friction-based contact detection techniques disclosed herein utilize a signal acquired by a friction-based contact sensor, such as a thermal sensor.

Figure 5:
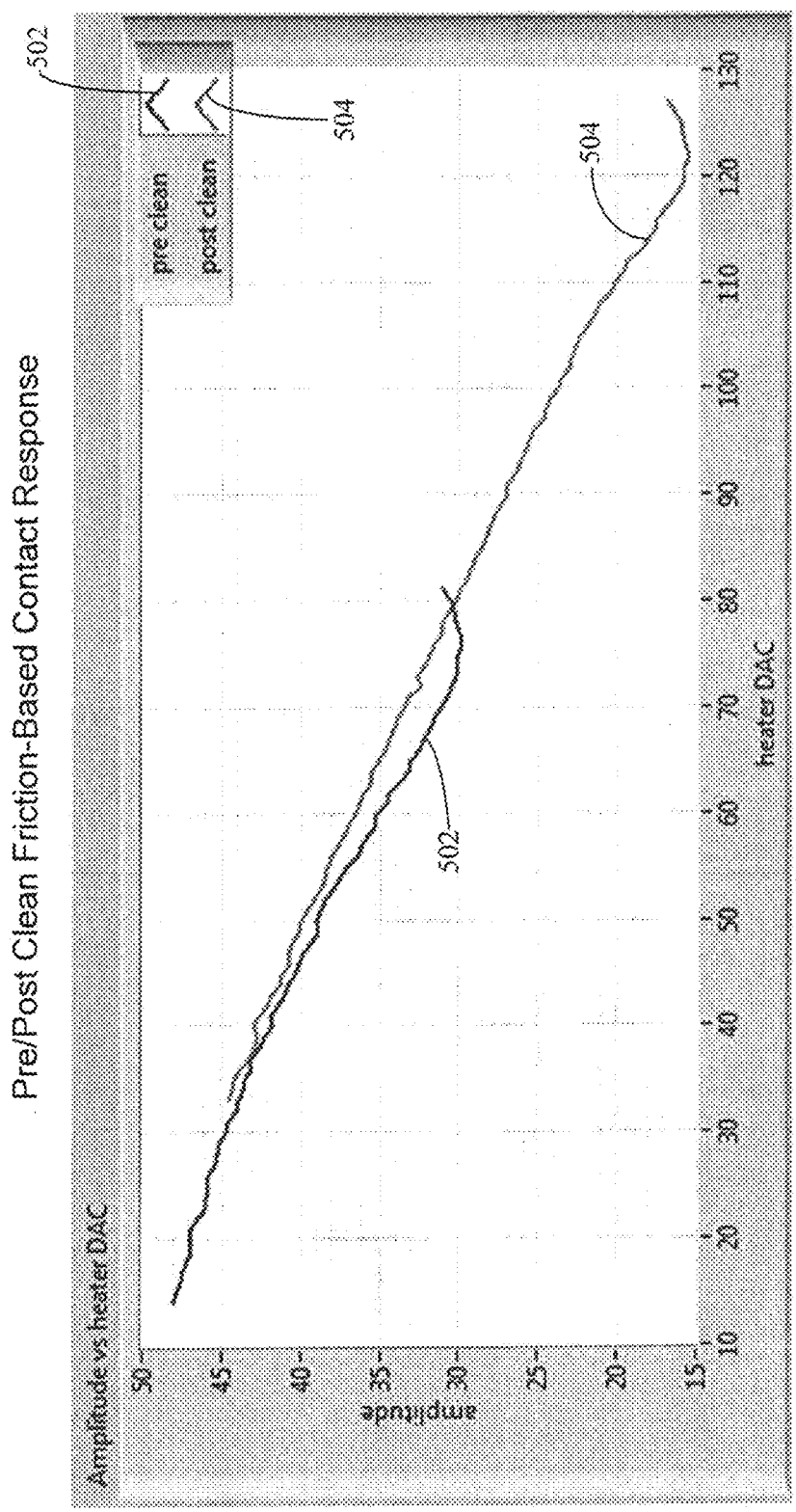
FIG. 5 shows a response curves for a contaminated friction-based sensor, which prematurely indicates head-medium contact, and a cleaned friction-based sensor, which accurately indicates head-medium contact in accordance with various embodiments.
Figure 6:
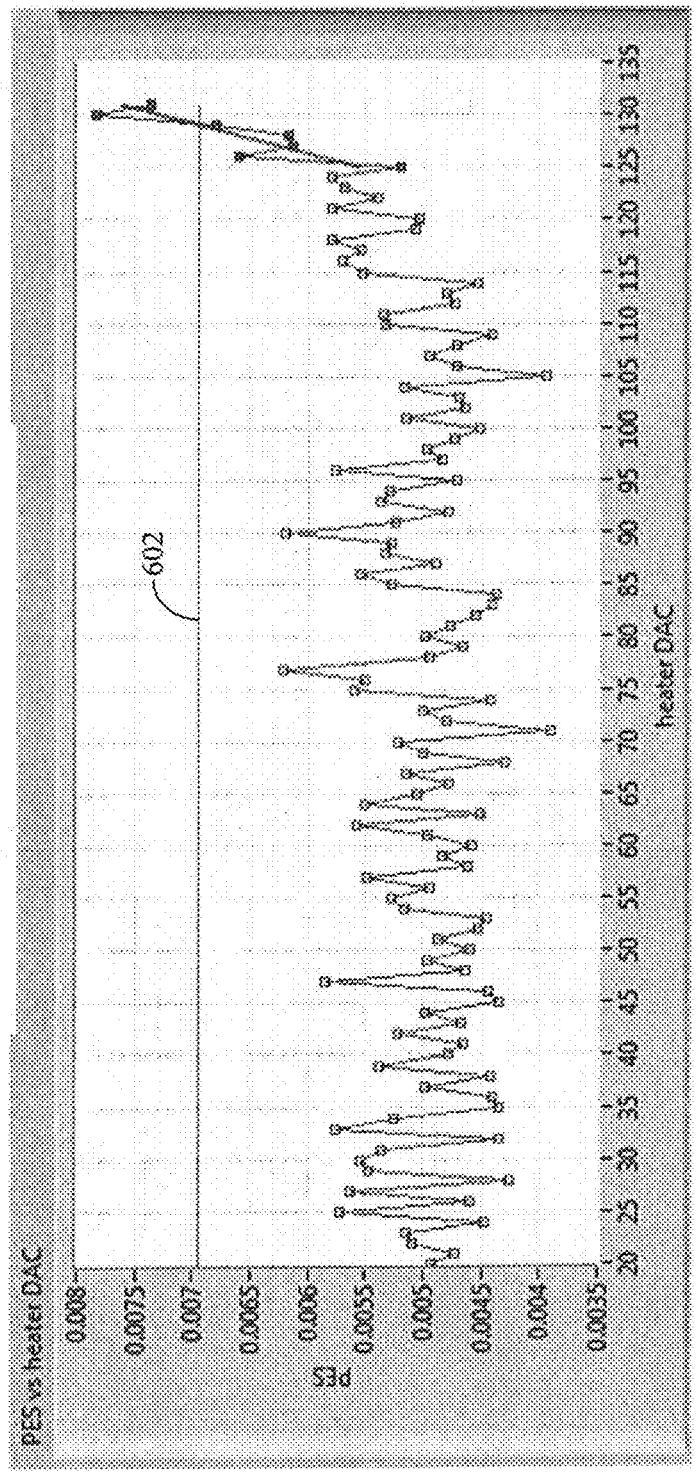
FIG. 6 shows a modulation-based response curve developed during a modulation-based slider cleaning procedure in accordance with various embodiments.

FIGS. 5 and 6 illustrate the combined use of friction- and modulation-based contact detection according to various embodiments. FIG. 5 shows a response curve 502 for a contaminated thermal sensor which prematurely indicates head-medium contact at a heater DAC value of about 75. The contaminated thermal sensor is cleaned using a modulation-based contact detection technique, as is illustrated in FIG. 6. After cleaning the thermal sensor using modulation-based contact detection, the thermal sensor is used to accurately detect head-medium contact at a heater DAC value of about 125, as indicated by the response curve 504.

FIG. 6 is a plot of position error signal (PES) at various heater DAC values. As the slider moves relative to the magnetic recording medium, magnetic transitions corresponding to servo data on the medium are read by the reader of the slider. The servo data read by the reader is used by a controller of the HAMR device, via the PES, to accurately position the slider within a data track of the medium. In response to a PES disturbance resulting from head-medium contact, the controller attempts to compensate for the PES disturbance. A sudden change in the effort of the controller to compensate for the PES disturbance can be used to detect head-medium contact. It is noted that a modulation-based contact detection technique for cleaning a friction-based contact detection sensor can use a signal other than a PES, such as a servo automatic gain control (AGC) signal, a voice coil motor injection current, or a microactuator control signal, which are discussed hereinbelow.

A radius of the medium and a protrusion state of the slider are chosen where modulation-based contact detection can provide a sufficient contact detection response. The protrusion state can be a state where the protrusion profile of the slider is large enough to produce a modulation in response to head-medium contact. For example, a useful protrusion state can be one that results from the writer being turned on and the laser being turned off. Another useful protrusion state can be one that results from the writer being turned off and the laser being turned off. A useful radius of the recording medium can be an extreme inner diameter location, although an extreme outer diameter location can also be useful. At an extreme inner or outer diameter location of the medium, modulation-based contact detection can provide a sufficient contact detection response for purposes of cleaning a contaminated friction-based contact sensor of the slider. It is understood that the radius of the medium and protrusion state can vary for different sliders and ABS designs.

In the illustrative example shown in FIG. 6, the heater DAC values are increased and the measured PES is plotted. A threshold 602 represents a PES at which head-medium contact occurs. The threshold 602 can be established empirically or through modeling. In this illustrative example, the PES does not react to the slider contamination at the heater DAC value of about 75. In contrast, the contaminated thermal sensor characterized in FIG. 5 incorrectly indicates head-media contact at a heater DAC value of about 75. The heater DAC values increase and the PES continues to increase until actual head-medium contact is realized at a DAC value of about 125. Notably, detection of head-medium contact using the PES (or other modulation-based contact detection parameter) indicates the point at which the slider cleaning process can be terminated. Detecting head-medium contact using the PES indicates that the contaminant has been successfully dislodged or otherwise removed from between the slider and the medium. After dislodging the contaminant from the slider, the thermal sensor can be used to accurately detect head-medium contact at any radius of the medium (see response curve 504 in FIG. 5).

Figure 7:
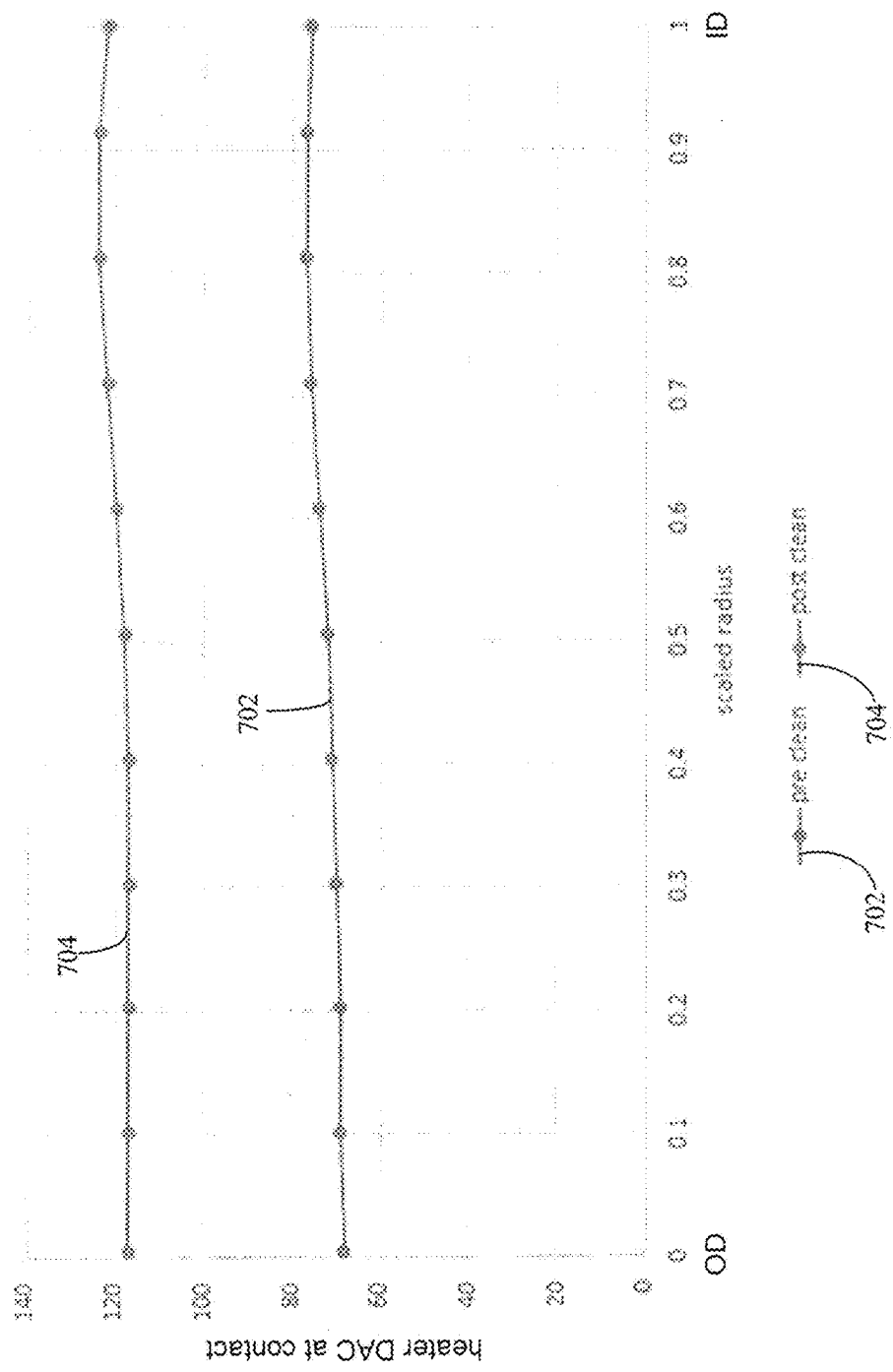
FIG. 7 shows pre- and post-cleaning contact profiles for a friction-based contact sensor using a cleaning methodology in accordance with various embodiments.

FIG. 7 shows pre- and post-cleaning contact profiles using a cleaning methodology in accordance with various embodiments. FIG. 7 shows heater DAC values for head-medium contact occurring at different radii (scaled) between an outer diameter (0=OD) and an inner diameter (1=ID) of the medium. Pre-cleaning curve 702 shows heater DAC values indicative of inaccurate head-medium contact detection by a contaminated thermal sensor. Post-cleaning curve 704 shows heater DAC values indicative of accurate contact detection by a thermal sensor devoid of contamination via a modulation-based cleaning methodology. It can be seen that the entire pre-cleaning contact profile indicated by curve 702 is shifted downward due to the contamination smearing over the thermal sensor. In this illustrative example, modulation-based cleaning was implemented at an inner diameter location (at or near scaled radius location 1). Cleaning the slider at the inner diameter location using a modulation-based cleaning technique is sufficient to restore the entire contact profile as indicated by curve 704. It is expected that cleaning of the slider at an outer diameter location at or near scaled radius location zero will produce the same result.

Figure 8:
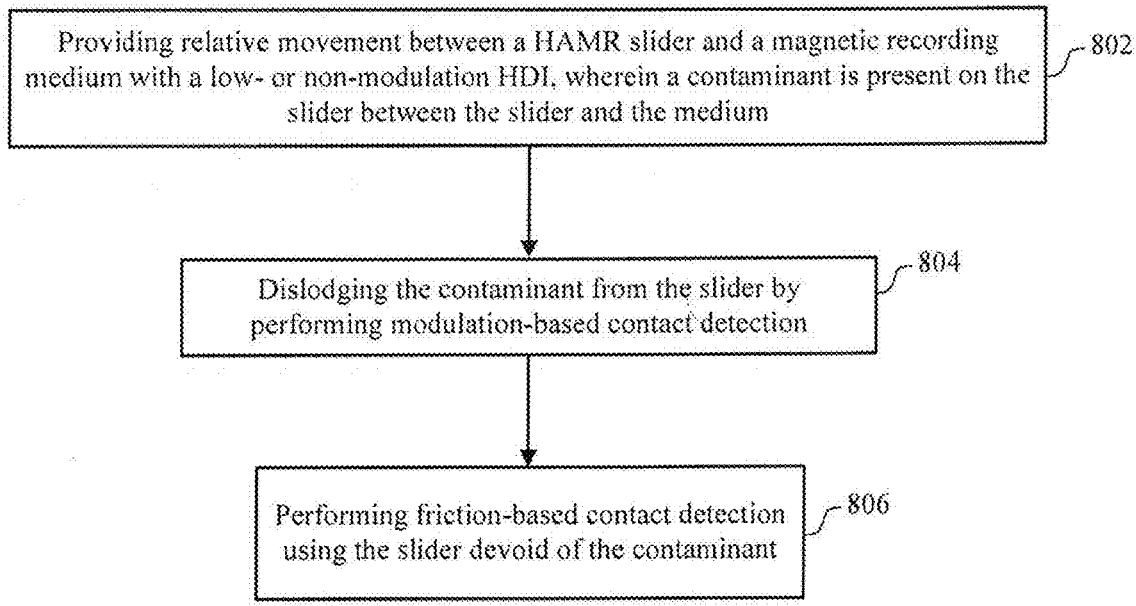
FIG. 8 is a flow diagram of a contact detection method which involves pre-cleaning of a HAMR slider in accordance with various embodiments.

FIG. 8 is a flow diagram of a contact detection method which involves pre-cleaning of a HAMR slider in accordance with various embodiments. The method shown in FIG. 8 involves providing 802 relative movement between the HAMR slider and a magnetic recording medium with a low- or non-modulation HDI. A contaminant is present on the slider, such that the contaminant is situated between the slider and the medium. The method involves dislodging 804 the contaminant from the slider by performing modulation-based contact detection. The method further involves performing 806 friction-based contact detection using the slider devoid of the contaminant.

Figure 9:
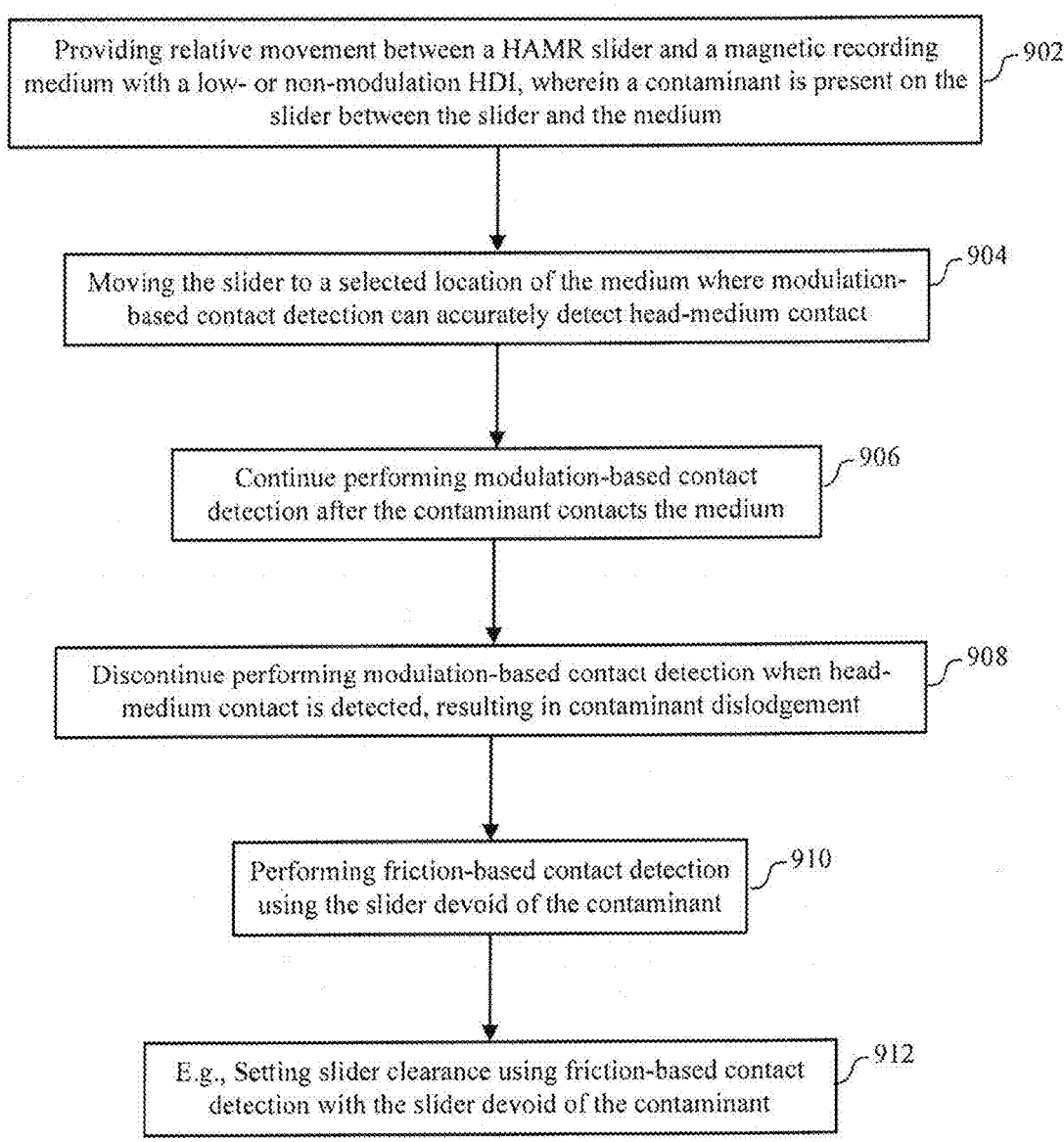
FIG. 9 is a flow diagram of a contact detection method which involves pre-cleaning of a HAMR slider in accordance with various embodiments.

FIG. 9 is a flow diagram of a contact detection method which involves pre-cleaning of a HAMR slider in accordance with other embodiments. The method shown in FIG. 9 involves providing 902 relative movement between the HAMR slider and a magnetic recording medium with a low- or non-modulation HDI. A contaminant is present on the slider, such that the contaminant is situated between the slider and the medium. The method involves moving 904 the slider to a selected location of the medium where modulation-based contact detection can accurately detect head-medium contact. The modulation-based contact detection is continued 906 after the contaminant contacts the medium. The modulation-based contact detection is discontinued 908 when head-medium contact is detected, resulting in dislodging of the contaminant from the slider. The method further involves performing 910 friction-based contact detection using the slider devoid of the contaminant. The method may involve, for example setting slider clearance 912 using friction-based contact detection with the slider devoid of the contaminant.

FIG. 10 is a block diagram of a contact detection apparatus configured to implement pre-cleaning of a HAMR slider in accordance with various embodiments. FIG. 10 shows a controller 1002 coupled to an HGA 1004 of a HAMR device. The HGA 1004 supports a slider 1006, which includes read/write heads (RW), one or more heaters (H), and one or more thermal sensors (TS). The slider 1006 is shown positioned in proximity to a magnetic recording medium 1008, with a low- or non-modulation HDI defined therebetween. It is understood that the controller 1002 may be coupled to a multiplicity of HGAs 1004 and sliders 1006, and that the HAMR device can include a multiplicity of recording mediums 1008. The controller 1002 is configured to implement pre-cleaning of the slider 1006 prior to implementing friction-based contact detection using the thermal sensor (TS) of the slider 1006. In some embodiments, the controller 1002 is configured to detect head-medium contact. In other embodiments, a detector 1003 is coupled to the controller 1002, and the detector 1003 is configured to detect head-medium contact.

The controller 1002 is configured to implement pre-cleaning of the slider 106 to dislodge a contaminant 1007 covering all or a portion of the thermal sensor (TS). A modulation-based contact detection technique is implemented by the controller 1002 at an inner or outer diameter location of the medium 1008. Following the cleaning procedure, the slider 1006 is devoid of the contaminant 1007. The controller 1002 is configured to implement friction-based contact detection using the cleaned slider 1006 at any radii of the medium 1008. For example, the controller 1002 can set slider clearance at a multiplicity of radii of the medium 1008. In some embodiments, the controller 1002 is configured to detect head-medium contact (e.g., modulation- and friction-based contact detection). In other embodiments, the detector 1003 is configured to detect head-medium contact (e.g., modulation- and friction-based contact detection).

Figure 11A:
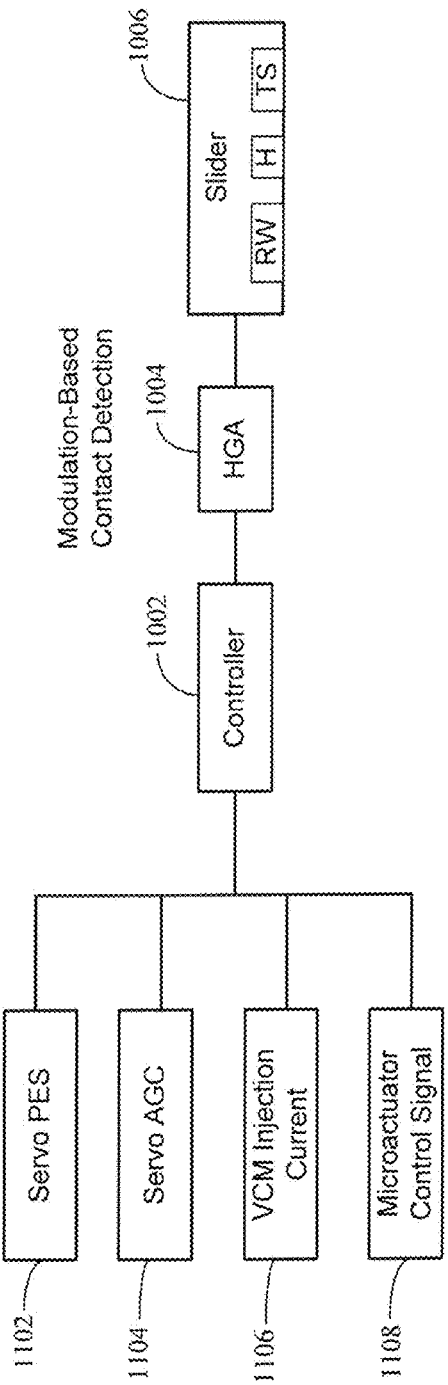
FIG. 11A is a block diagram of an apparatus configured to implement modulation-based pre-cleaning of a HAMR slider in accordance with various embodiments.
Figure 11B:
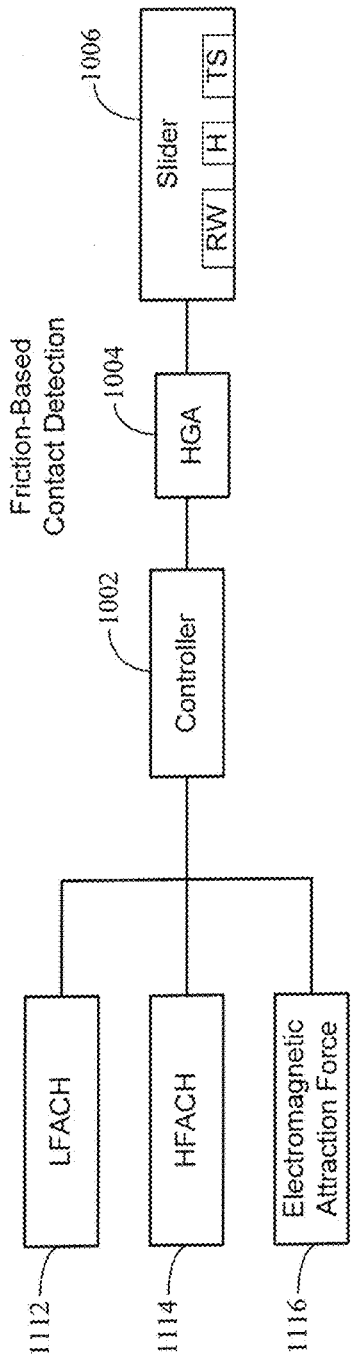
FIG. 11B is a block diagram of an apparatus configured to implement friction-based contact detection following modulation-based cleaning of a HAMR slider 1006 in accordance with various embodiments.

FIGS. 11A and 11B show the controller 1002 coupled to the HGA 1004 and slider 1006 illustrated in FIG. 10. The controller 1002 can be configured to receive different types of signals for implementing modulation-based cleaning of the slider in accordance with various embodiments. In some embodiments, such as those discussed previously, the controller 1002 is configured to receive a servo PES 1102 to detect head-medium contact and to terminate the cleaning procedure. In other embodiments, the controller 1002 is configured to receive a servo AGC signal 1104 to detect head-medium contact and to terminate the cleaning procedure. In further embodiments, the controller 1002 is configured to receive a VCM (voice coil motor) injection current 1106 to detect head-medium contact and to terminate the cleaning procedure. In yet other embodiments, the controller 1002 is configured to receive a microactuator control signal 1108 to detect head-medium contact and to terminate the cleaning procedure. Details of various types of modulation-based contact detection are disclosed in commonly owned U.S. Pat. Nos. 9,047,898 and 9,437,234, which are incorporated herein by reference.

As is shown in FIG. 11B, following modulation-based cleaning of the slider 1006, the controller 1002 can be configured to implement one of several different friction-based contact detection techniques using a friction-based sensor (e.g., thermal sensor TS) of the slider 1006 in accordance with various embodiments. According to some embodiments, the controller 1002 is configured to implement a low-frequency AC heater (LFACH) contact detection procedure 1112 using the thermal sensor (TS). According to other embodiments, the controller 1002 is configured to implement a high-frequency AC heater (HFACH) contact detection procedure 1114 using the thermal sensor (TS). In further embodiments, the controller 1002 is configured to implement a contact detection procedure using electromagnetic attraction force 1016 between the slider 1006 and a recording medium.

Performing LFACH contact detection 1112 involves supplying a low-frequency AC heater signal to the heater (H) at a frequency (e.g., frequencies lower than about 1 kHz) that allows a temperature change in the heater (H) to response to the induced heater oscillations. In LFACH 1112, the amplitude of the heater voltage/power follows an oscillation that causes the fly height of the slider 1006 to follow the same oscillation. The thermal sensor (TS) (e.g., DETCR) of the slider 1006 detects the oscillation and produces an oscillating sensor signal, which when combined with the heater power can be used to detect head-medium contact.

Supplying an AC heater signal to the heater (H) above a frequency corresponding to the thermal time constant of the material at the ABS of the slider 1006 (e.g., above 1 kHz) results in a reduction of the amplitude of the mechanical modulation at the slider 1006. A relatively high frequency AC signal can be supplied to the heater (H) of the slider 1006 for purposes of conducting contact detection, which is referred to as HFACH (high-frequency AC heater) contact detection 1114. The reduction in amplitude of the mechanical modulation at the slider 1006 resulting from application of the relatively high frequency AC signal (in comparison to a low frequency AC signal below 1 kHz) to the heater (H) is offset by the benefit of enhancing detection of the slider modulation above a frequency (or within a frequency range) that facilitates reliable detection of head-medium contact.

In HFACH contact detection 1114, the AC signal supplied to the heater (H) can have a frequency above a frequency corresponding to the thermal time constant of the material at the ABS at or near the thermal sensor (TS) of the slider 1006. In other words, the frequency of the AC signal supplied to the heater (H) preferably induces a mechanical oscillation in the heater (H) at a frequency greater than a frequency at which the heater temperature can respond to the AC signal.

In some embodiments, the frequency of the AC signal supplied to the heater (H) is higher than about 3-4 kHz. For example, the frequency of the AC signal supplied to the heater (H) can fall within a range between about 3 and 8 kHz. In various embodiments, the frequency of the AC signal supplied to the heater (H) is higher than the frequency bandwidth of the actuator (voice coil motor) used to position the slider 1006 relative to the recording medium. Exciting the slider 1006 to a frequency above the frequency bandwidth of the actuator allows for reliable detection of slider oscillation at the AC signal frequency during a head-medium contact event. Details of head-medium contact detection using LFACH contact detection 1112 and HFACH contact detection 1114 are disclosed in commonly owned U.S. Pat. No. 9,437,234, which is incorporated herein by reference.

According to other embodiments, an electromagnetic attraction force 1116 between the slider 1006 and a magnetic recording medium can be controlled to perform head-medium contact detection. An oscillation in the electromagnetic attraction force is caused between the slider 1006 and the recording medium. In response to the oscillating electromagnetic attraction force, the thermal sensor (TS) of the slider 1006 measures a resulting change in temperature and produces a corresponding oscillating sensor signal. Head-medium contact is detected using the sensor signal response to the oscillating electromagnetic attraction force. Details of conducting head-medium contact detection using an electromagnetic attraction force 1116 are disclosed in commonly owned U.S. Pat. Nos. 8,995,076 and 9,245,561, which are incorporated herein by reference.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Systems, devices or methods disclosed herein may include one or more of the features structures, methods, or combination thereof described herein. For example, a device or method may be implemented to include one or more of the features and/or processes above. Embodiments disclosed herein are generally described in the context of HAMR. It is understood that various embodiments are applicable to conventional magnetic recording devices (e.g., non-HAMR devices). It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. A method, comprising:
providing relative movement between a heat-assisted magnetic recording slider and a magnetic recording medium, a low- or non-modulation interface defined between the slider and the medium, wherein a contaminant is present on the slider and between the slider and the medium;
dislodging the contaminant from the slider by performing modulation-based contact detection at a location of the medium where modulation-based contact detection can accurately detect head-medium contact; and
performing friction-based contact detection using the slider devoid of the contaminant.

2. The method of claim 1, comprising setting clearance of the slider relative to the medium using friction-based contact detection and the slider devoid of the contaminant.

3. The method of claim 1, wherein modulation-based contact detection is performed at or near an inner diameter of the medium.

4. The method of claim 1, wherein modulation-based contact detection is performed at or near an outer diameter of the medium.

5. The method of claim 1, wherein modulation-based contact detection uses a position error signal to detect head-medium contact.

6. The method of claim 1, wherein modulation-based contact detection uses one of an automatic gain control signal, an injection current into a voice coil motor, and a microactuator control current to detect head-medium contact.

7. The method of claim 1, wherein friction-based contact detection uses a response of a thermal sensor of the slider.

8. The method of claim 1, wherein friction-based contact detection comprises low-frequency AC heater (LFACH) contact detection.

9. The method of claim 1, wherein friction-based contact detection comprises oscillation of an electromagnetic attraction force between the slider and the medium.

10. The method of claim 1, wherein the modulation-based contact detection is less sensitive to the slider contaminant than the friction-based contact detection.

11. An apparatus, comprising:
a slider configured for heat-assisted magnetic recording to a magnetic recording medium, a low- or non-modulation interface defined between the slider and the medium, wherein a contaminant is present on the slider and between the slider and the medium; and
a controller configured to control the slider to:
dislodge the contaminant from the slider by performing modulation-based contact detection at a location of the medium where modulation-based contact detection can accurately detect head-medium contact; and
perform friction-based contact detection using the slider devoid of the contaminant.

12. The apparatus of claim 11, wherein the controller is configured to set clearance of the slider relative to the medium using friction-based contact detection and the slider devoid of the contaminant.

13. The apparatus of claim 11, wherein the controller is configured to perform modulation-based contact detection at or near an inner diameter of the medium.

14. The apparatus of claim 11, wherein the controller is configured to perform modulation-based contact detection at or near an outer diameter of the medium.

15. The apparatus of claim 11, wherein the controller is configured to perform modulation-based contact detection using a position error signal to detect head-medium contact.

16. The apparatus of claim 11, wherein the controller is configured to perform modulation-based contact detection using one of an automatic gain control signal, a voice coil motor injection current, and a microactuator control current to detect head-medium contact.

17. The apparatus of claim 11, wherein:
the slider comprises a thermal sensor; and
the controller is configured to perform friction-based contact detection using a response of the thermal sensor.

18. The apparatus of claim 11, wherein friction-based contact detection comprises low-frequency AC heater (LFACH) contact detection.

19. The apparatus of claim 11, wherein friction-based contact detection comprises oscillation of an electromagnetic attraction force between the slider and the medium.

20. The apparatus of claim 11, wherein the modulation-based contact detection is less sensitive to the slider contaminant than the friction-based contact detection.

* * * * *